United States Patent [19]
Bolla et al.

[11] Patent Number: 5,937,008
[45] Date of Patent: Aug. 10, 1999

[54] METHOD AND SYSTEM FOR CONTROLLING THE MINIMAL DISTANCE BETWEEN SUCCESSIVE ERRORS IN DIGITAL RADIO TRANSMISSION

[75] Inventors: Maurizio Bolla, Milano; Roberto Pellizzoni, Cantu; Arnaldo Spalvieri, Senigallia, all of Italy

[73] Assignee: Alcatel Italia S.p.A., Milan, Italy

[21] Appl. No.: 08/944,243

[22] Filed: Oct. 6, 1997

Related U.S. Application Data

[63] Continuation of application No. 08/006,052, Jan. 19, 1993, abandoned.

[30] Foreign Application Priority Data

Jan. 22, 1992 [IT] Italy .................................. MI92A0109

[51] Int. Cl.$^6$ .................................................. H04L 27/00
[52] U.S. Cl. ........................... 375/259; 375/264; 375/286; 371/48
[58] Field of Search ...................................... 375/286, 287, 375/340, 342, 346, 259, 264, 285, 288, 296; 371/48, 30, 41

[56] References Cited

U.S. PATENT DOCUMENTS

| | | | |
|---|---|---|---|
| 3,573,729 | 4/1971 | Gunn ...................................... | 371/56 X |
| 3,585,586 | 6/1971 | Harmon et al. . | |
| 4,571,735 | 2/1986 | Furse ...................................... | 371/56 X |
| 4,630,286 | 12/1986 | Betts . | |
| 4,677,626 | 6/1987 | Betts et al. . | |

FOREIGN PATENT DOCUMENTS 2142806  1/1985  United Kingdom .

OTHER PUBLICATIONS

"Convolutionally Interleaved PSK and DPSK Trellis Codes for Shadowed, Fast Fading Mobile Satellite Communication Channels", by Albert Lee et al., "IEEE Transactions on Vehicular Tech", vol. 39, No. 1, Feb. 1990, pp. 37–47.

"Multilevel Signaling", Digital Telephony, by J. Bellamy, John Wiley & Sons, Inc., Second Edition, Section 4.3.9, pp. 188–189.

"Telecommunication Transmission Systems" by Robert G. Winch, McGraw–Hill, Inc., Chapter 3, Signal Processing for Digital Radio Communications, pp. 89–105.

"Multilevel Signalling, Partial Response Signal, and Duo-binary Coding", The Mobile Communications Handbook by J.D. Gibson, IEEE Press, pp. 95 and 96.

Lee et al, "Convolutionally Interleaved PSK and DPSK Trellis Codes for Shadowing, Fast Fading Mobile Satellite Communications Channels", Vehicular Technology, 1988 Conference pp. 438–444.

"Convolutionally Interleaved PSK and DPSK Trellis Codes for Shadowed, Fast Fading Mibile Satellite Communication Chanels" by Albert M. Lee et al "IEEE Transactions on Vehicular Tech" vol. 39, No. 1, Feb. 1990 pp. 37–47.

*Primary Examiner*—Chi H. Pham
*Assistant Examiner*—Bryan Webster
*Attorney, Agent, or Firm*—Ware, Fressola, Van Der Sluys & Adolphson LLP

[57] ABSTRACT

The invention concerns a method of controlling the minimal distance between successive errors in digital radio transmissions when multilevel modulations are used. With such a method the errors are spaced according to the needs, with an extremely reduced use of hardware with respect to prior art techniques. The method is characterized in that, in transmission a differential delay, i.e. different from flow to flow, is applied to each parallel flow not yet modulated, and in reception a differential delay is applied to each demodulated flow in such a way that the overall delay applied to each flow, i.e. the sum of the delay applied in transmission and the delay applied in reception, is constant and equal for all the flows.

10 Claims, 1 Drawing Sheet

METHOD AND SYSTEM FOR CONTROLLING THE MINIMAL DISTANCE BETWEEN SUCCESSIVE ERRORS IN DIGITAL RADIO TRANSMISSION

This application is a continuation of application Ser. No. 08/006,052 filed on Jan. 19, 1993 now abandoned.

TECHNICAL FIELD

The present invention relates to a method of controlling the minimal distance between successive errors in digital radio transmissions, in which a serial signal is split up in parallel signal flows which are modulated at several levels, are transmitted in a channel, are demodulated in reception and re-converted in a unique serial flow, wherein distance is meant the number of correct bits between two successive incorrect bits.

The invention also relates to a system for controlling the minimal distance between successive errors in digital radio transmissions, in particular when multilevel modulations (like M–QAM or M–PSK, M>2) are used.

DESCRIPTION OF PRIOR ART

High capacity digital radio transmissions use multilevel modulations as a rule. The bit flow at the input of the modulator is converted into n parallel flows, depending on the type of modulation, and is transmitted in the channel in the form of $2^n$-ary symbols.

An eventual error occurring on the channel affects the $2^n$-ary symbol; when parallel flows are re-converted into a unique binary flow, the channel error reveals itself in a set of errors which affect up to n successive bits. Because of various needs it can be necessary to provide that these errors are dispersed in time and are not left concentrated in n successive bits.

In order to oppose these error sets on the serial flow it is usual to resort to particular error correction codes or to interleaving techniques. Both these countermeasures have a high circuit complexity and need anything but simple decoding techniques.

SUMMARY OF THE INVENTION

The object of the present invention is to provide a simple method which spaces out in time the errors on serial flow, thus avoiding groups of close, if not consecutive errors.

The proposed method has the advantage of being easily implementable, with the use of extremely reduced hardware with respect to the known techniques.

It is characterized in that in transmission, a differential, i.e. different from flow to flow, delay is applied to each parallel flow not yet modulated, and in reception a differential delay is applied on each demodulated flow in such a way that the overall delay applied on each flow, i.e. the sum of the delay applied in transmission and the delay applied in reception is constant and equal for all flows.

The system according to the invention features n differential-delay lines for each of the n flows between the S/P converter and the modulator, and between the demodulator and the P/S converter.

GENERAL SOLUTION

Figure 1:
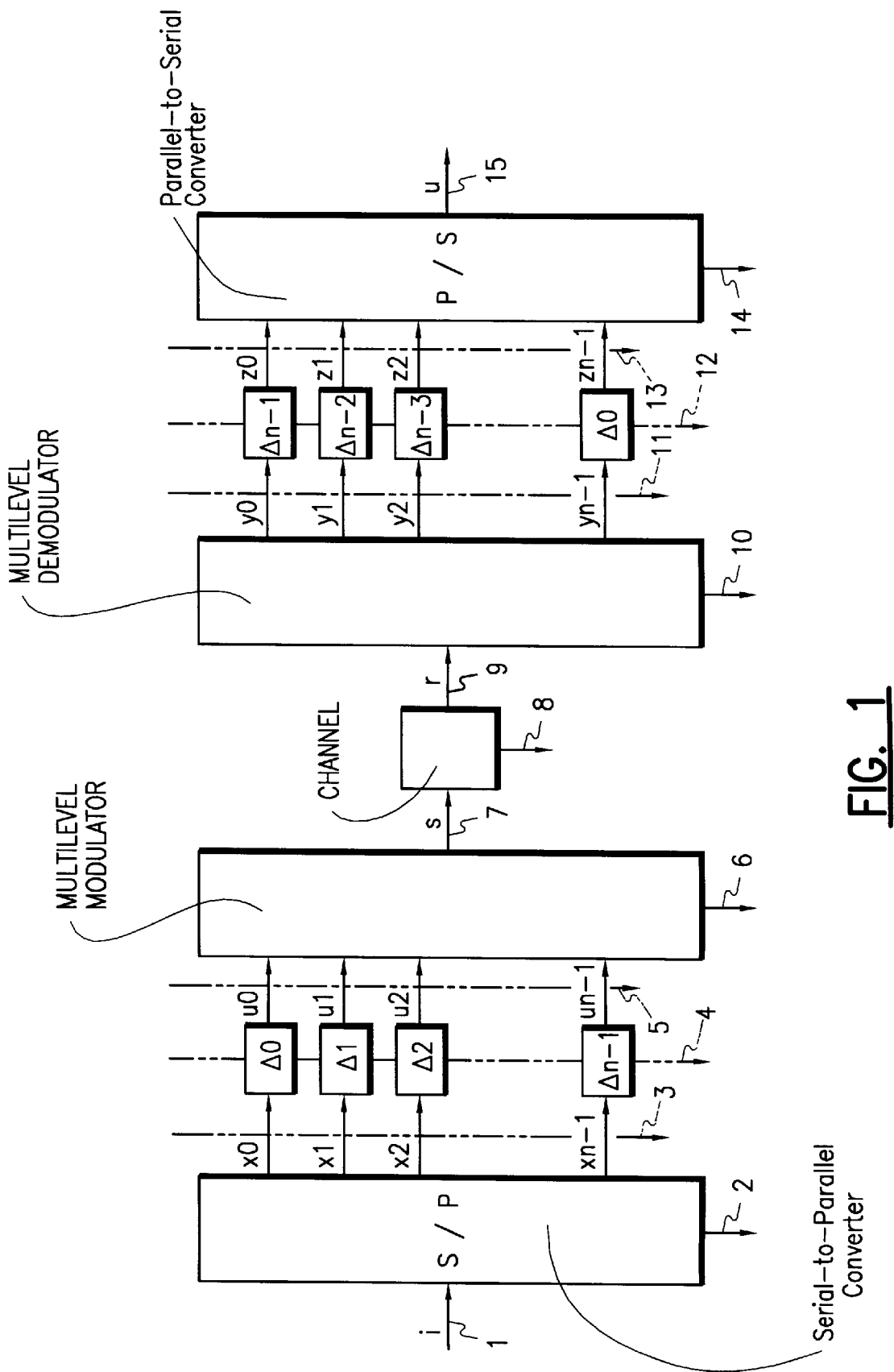
FIG. 1, illustrates the scheme of the proposed solution for a 2n level generic modulation as described in the specification.

The solution according to the invention is based upon the introduction of a different delay on each of the n parallel flows which compose the symbol transmitted into the channel.

If $\Delta$=nd is the minimal distance which one wants to obtain between two successive errors on the serial flow, the delays are introduced respectively $\Delta 0$=0 d t on the first flow
$\Delta 1$=1 d T on the second flow
$\Delta 2$=2 d T on the third flow
$\Delta n-1$=(n−1) dT on the nth flow, where T is symbol time.

In reception, differentiated delays are introduced in a complementary way with respect to transmission, i.e.

$\Delta n - 1 = (n - 1)$ dT on the first flow,
$\Delta n - 2 = (n - 2)$ dT on the second flow, $\Delta 0 = 0$ d T on the nth flow.

With this scheme, the possibility of having two errors on the serial flow at a distance less than nd is eliminated. In fact an error-on-the channel event, which as said may reveal itself in a set of at most n successive errors, thanks to differentiated delays will appear on the serial flow with incorrect bits at a distance greater than or equal to $\Delta$=nd.

Obviously all the above is true if only single errors on the channel are taken into consideration, but the probability of having pairs of successive errors is, in a first approximation, negligible as compared with the probability of having single errors.

In order to realize delays $\Delta k$=kdT it is sufficient to use simple delay lines consisting of flip-flops, easily obtainable both in discrete and in integrated logic.

The proposed technique can be used for all the multilevel modulations, and by varying the parameter "d", the distances necessary to the requirement of the system can be obtained.

An example of use of the proposed technique is given by the transmission of an SDH signal, of the synchronous hierarchy, on a radio link. The SDH frame contains special bits, called pointers, that give information on the synchronization of the frame itself. These bits are organized in two successive bytes of eight bits each and, when disturbed by three or more errors, a loss of synchronism of the system takes place, with catastrophic consequences on the quality of the link. Let us assume that an SDH signal is transmitted with 32–QAM modulation, i.e. with n=5. The distance between serial errors is desired to be $\Delta$>16. Since $\Delta$=nd we obtain d=4. The five delays to be introduced on five flows will then be $\Delta o$=0, $\Delta 1$=4T, $\Delta 2$=8T, $\Delta 3$=12T, $\Delta 4$=16T. In this way the effect of single channel errors on the two bytes of pointers is completely eliminated thus improving the quality of the link.

The scheme of the proposed solution for a 2n level generic modulation is illustrated in detail (FIG. 1). Signal i from the source enters the series/parallel converter 2 through lines 1. At its output there are n parallel flows Xo, X1, . . . , Xn−1 (lines 3). To each flow Xi, the delay $\Delta i$ indicated by reference numeral 4 is applied and the signals so obtained are fed to modulator 6 through lines 5.

The modulator generates the multilevel signal s and transmits it in channel 8 through line 7. The channel adds the eventual errors by providing signal r which is transmitted to demodulator 10 through line 9. The demodulator provides n flows Yo, . . . Yn−1 (lines 11), in which an eventual error reveals itself at the same time. The delay Δn−1−i, indicated with 12, complementary to the transmission one, is applied to each flow Yi. Signals zi thus obtained are transmitted through lines 13 to the parallel/series converter 14 which provides the output u on the line 15.

What is claimed is:

1. A method of controlling a distance between successive errors in a multilevel digital radio transmission system, comprising the steps of:

splitting up a serial signal into n parallel signal flows that are multilevel modulated into a multilevel digital radio transmission signal having $2^n$ modulation levels, where n is greater than or equal to 2, transmitting the multilevel digital radio transmission signal in the channel, receiving, multilevel demodulating and re-converting the multilevel digital radio transmission signal in a unique serial flow, and defining a minimal distance Δ between successive errors as the number of correct bits between two successive incorrect bits that is equal to the value n*d, where the value of the parameter d controls the minimum distance Δ necessary to meet the requirements desired for both transmission and reception in the multilevel digital radio transmission system, applying in transmission a differential delay, i.e. different from flow to flow, to each of the n parallel signal flows not yet multilevel modulated, and applying in reception a complimentary differential delay to each of n multilevel demodulated parallel signal flows in such a way that the overall delay applied to each flow, i.e. the sum of the delay applied in transmission and the delay applied in reception, is constant and equal for all signal flows.

2. A method according to claim 1, characterized in that the delays on flows in transmission increase progressively from one flow to another according to an increasing law, and the delays on demodulated flows in reception decrease according to the same but decreasing law.

3. A method according to claim 2, characterized in that delays always increasing of a same fixed quantity "d" are given and the minimal distance Δ between consecutive errors is Δ=nd, n being equal to the number of parallel flows.

4. A system for obtaining a minimal distance between successive errors in a multilevel modulation digital radio transmission signal having $2^n$ modulation levels, where n is greater than or equal to 2, the system including at least a serial-to-parallel (S/P) converter and a multilevel modulator in transmission, and a multilevel demodulator and a parallel-to-serial (P/S) converter in reception, characterized in that the system comprises n differentiated delay means for each of the n signal flows between the S/P converter and the multilevel modulator, and the system further comprises n complimentary differentiated delay means for each of the n signal flows between the multilevel demodulator and the P/S converter;

wherein the minimal distance Δ between successive errors being defined as the number of correct bits between two successive incorrect bits and equals the value n*d, where the value of the parameter d controls the minimum distance Δ necessary to meet the requirements desired for both the transmission and the reception in a given multilevel digital radio transmission system.

5. A system according to claim 4, characterized in that the system comprises 2 n delay lines as a whole.

6. A system according to claim 4, characterized in that said delay lines are implemented through flip-flops.

7. A system for obtaining a minimal distance between successive errors in a multilevel modulation digital radio transmission signal having $2^n$ modulation levels, where n is greater than or equal to 2, comprising:

serial-to-parallel conversion means, responsive to a serial digital radio transmission signal, for providing n parallel digital radio transmission signals;

n differential delay means, each responsive to one of the n parallel digital radio transmission signals, each for providing n differentially-delayed digital radio transmission signal;

multilevel modulation means, responsive to the n differentially-delayed digital radio transmission signal, for providing a multilevel modulated differentially-delayed digital radio transmission signal;

channel means, responsive to the multilevel modulated differentially-delayed digital radio transmission signal, for providing a transmitted multilevel modulated differentially-delayed digital radio transmission signal;

multilevel demodulation means, responsive to the transmitted multilevel modulated differentially-delayed digital radio transmission signal, for providing n multilevel demodulated differentially-delayed digital radio transmission signals;

n complementary differential delay means, each responsive to one of the n demodulated differentially-delayed digital radio transmission signal, for providing n corresponding complementary differentially-delayed digital radio transmission signal; and parallel-to-serial conversion means, responsive to the n corresponding complementary differentially-delayed digital radio transmission signal, for providing a corresponding serial digital radio transmission signal;

wherein the minimal distance Δ between successive errors being defined as the number of correct bits between two successive incorrect bits and equals the value n*d, where the value of the parameter d controls the minimum distance Δ necessary to meet the requirements desired for both transmission and reception in a given multilevel digital radio transmission system.

8. A system according to claim 7, wherein the multilevel modulation means is a quadrature amplitude modulation (QAM) means.

9. A system according to claim 4, wherein the multilevel modulation is a quadrature amplitude modulation (QAM) means.

10. A method according to claim 1, wherein method includes using a quadrature amplitude modulation (QAM) means to multilevel modulate the parallel signal flows into the multilevel digital radio transmission signal.

* * * * *